United States Patent
Beuth

(10) Patent No.: US 11,572,064 B2
(45) Date of Patent: Feb. 7, 2023

(54) METHOD FOR MONITORING A SURROUNDING AREA OF A MOTOR VEHICLE, SENSOR CONTROL UNIT, DRIVER ASSISTANCE SYSTEM AND MOTOR VEHICLE

(71) Applicant: Valeo Schalter und Sensoren GmbH, Bietigheim-Bissingen (DE)

(72) Inventor: Thorsten Beuth, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 233 days.

(21) Appl. No.: 16/637,105

(22) PCT Filed: Aug. 2, 2018

(86) PCT No.: PCT/EP2018/070936
§ 371 (c)(1),
(2) Date: Feb. 6, 2020

(87) PCT Pub. No.: WO2019/030094
PCT Pub. Date: Feb. 14, 2019

(65) Prior Publication Data
US 2020/0247403 A1    Aug. 6, 2020

(30) Foreign Application Priority Data
Aug. 9, 2017  (DE) ..................... 10 2017 118 156.3

(51) Int. Cl.
*B60W 30/095* (2012.01)
*G01S 17/931* (2020.01)
(Continued)

(52) U.S. Cl.
CPC ..... *B60W 30/0956* (2013.01); *B60W 2420/42* (2013.01); *B60W 2420/52* (2013.01);
(Continued)

(58) Field of Classification Search
CPC ......... B60W 30/0956; B60W 2420/42; B60W 2420/52; G01S 17/931; G01S 13/931; G01S 15/931
See application file for complete search history.

(56) References Cited

U.S. PATENT DOCUMENTS 6,664,918 B2    12/2003   Paradie et al.

FOREIGN PATENT DOCUMENTS

DE    102012024874 A1 *  6/2014  ............ B60W 40/06
DE    102013021837 A1    6/2015
(Continued)

OTHER PUBLICATIONS

International Search Report and Written Opinion corresponding to International Patent Application No. PCT/EP2018/070936, dated Oct. 30, 2018 (11 pages).
(Continued)

*Primary Examiner* — Peter D Nolan
*Assistant Examiner* — Demetra R Smith-Stewart
(74) *Attorney, Agent, or Firm* — Osha Bergman Watanabe & Burton LLP

(57) ABSTRACT

The invention relates to a method for monitoring a surrounding area (6) of a motor vehicle (1), wherein measurement points of surfaces of objects (7) in the surrounding area (6) detected by at least two sensor devices (4, 5) of the motor vehicle (1) are received, and wherein first measurement points of a first surface area (13) detected by a first sensor device (4) are received and second measurement points of a second surface area (14) with no overlap with the first surface area (13) detected by a second sensor device (5) are received, the first and second measurement points are used to determine a relative position of the surface areas (13, 14) with respect to each other, it is determined whether the surface areas (13, 14) are to be assigned to a single object (7)
(Continued)

based on the relative position and, if so, the surface areas (13, 14) are combined into a total surface area (12) of the object (7). The invention also concerns a sensor control unit (9), a driver assistance system (2) and a motor vehicle (1).

14 Claims, 3 Drawing Sheets

(51) Int. Cl.
  *G01S 13/931* (2020.01)
  *G01S 15/931* (2020.01)
(52) U.S. Cl.
  CPC ........... *G01S 13/931* (2013.01); *G01S 15/931* (2013.01); *G01S 17/931* (2020.01)

(56) References Cited

FOREIGN PATENT DOCUMENTS

| | | | | |
|---|---|---|---|---|
| DE | 102014213536 A1 * | 1/2016 | ........... | G06T 3/4038 |
| DE | 102015201706 A1 | 8/2016 | | |
| EP | 1405100 B1 | 9/2008 | | |
| JP | 5343042 B2 * | 11/2013 | ............. | G06T 17/10 |
| JP | 2017162125 A * | 9/2017 | ........... | G01S 13/878 |
| WO | 2016/020347 A1 | 2/2016 | | |
| WO | WO-2017149526 A2 * | 9/2017 | ........... | G01S 13/878 |
| WO | WO-2018127789 A1 * | 7/2018 | ........... | G01S 7/4815 |

OTHER PUBLICATIONS

German Search Report issued in corresponding German Application No. 10 2017 118 156.3, dated May 24, 2018 (5 pages).

* cited by examiner

METHOD FOR MONITORING A SURROUNDING AREA OF A MOTOR VEHICLE, SENSOR CONTROL UNIT, DRIVER ASSISTANCE SYSTEM AND MOTOR VEHICLE

The invention relates to a method for monitoring a surrounding area of a motor vehicle, wherein measurement points of surfaces of objects in the surrounding area measured by at least two sensor devices of the motor vehicle are received. The invention also relates to a sensor control unit, a driver assistance system and a motor vehicle.

It is already known from the prior art to monitor the surroundings of a motor vehicle by means of sensor devices or sensors of the motor vehicle. By means of such sensor devices, for example, objects or articles in the surrounding area of the motor vehicle can be detected and their spatial locations relative to the motor vehicle can be determined. For this purpose, EP 1 405 100 B1 discloses a method for providing corrected data for the generation of a model of a monitoring area that is contained in the respective visual ranges of at least two optoelectronic sensors, in particular laser scanners, for determining the location of detected articles. Based on the corrected data, object detection for an article can also be performed in the intersection area of the sensors. The corrected data for the same article from the different perspectives of the sensors can be merged, thereby avoiding complications by merging only partially intersecting objects belonging to the same article.

However, it is problematic if the viewing areas or detection areas of the sensor devices do not overlap, so that the sensor devices are "blind" in these overlap-free areas in the surrounding area. Now if an object is in the visible areas of the sensor devices as well as in the blind overlapping area, it may happen that the object is incorrectly recognized or characterized as two separate objects. This can be problematic if the area between the objects that are mistakenly characterized as separate objects is large enough for the motor vehicle and is therefore rated as passable for the motor vehicle.

It is the object of the present invention to provide a solution to how objects in the surroundings of a motor vehicle can be reliably detected for monitoring the surroundings.

This object is achieved according to the invention by a method, a sensor control unit, a driver assistance system and a motor vehicle with the features according to the respective independent claims. Advantageous embodiments of the invention are the subject matter of the dependent claims, description and figures.

According to one embodiment of a method according to the invention for monitoring a surrounding area of a motor vehicle, measurement points of surfaces of objects in the surrounding area detected by at least two sensor devices of the motor vehicle are received. In particular, first measurement points of a first surface area detected by a first sensor device are received and second measurement points of a surface area with no overlap with the first surface area detected by a second sensor device are received. Based on the first and second measurement points, a relative position of the surface areas with respect to each other can be determined and based on the relative position it can be determined whether the surface areas are to be assigned to a single object. If this is the case, the surface areas are combined into a total surface area of the object.

According to a particularly preferred embodiment of a method according to the invention for monitoring a surrounding area of a motor vehicle, measurement points of surfaces of objects in the surrounding area detected by at least two sensor devices of the motor vehicle are received. Moreover, first measurement points of a first surface area detected by a first sensor device are received and second measurement points of a surface area with no overlap with the first surface area detected by a second sensor device are received. Based on the first and second measurement points, a relative position of the surface areas with respect to each other is determined and using the relative position it is determined whether the surface areas are to be assigned to a single object. If this is the case, the surface areas are combined into a total surface area of the object.

By means of the method, objects in the surrounding area of the motor vehicle can be characterized. Information about the characterized object may be provided to a control unit of a driver assistance system of the motor vehicle, which is designed to assist a driver of the motor vehicle in driving the motor vehicle by means of assistance functions. In order to provide an assistance function, the control unit may, for example, be designed to manoeuvre the motor vehicle at least semi-autonomously and/or to provide measures to avoid a collision of the motor vehicle with the object. Such a collision-avoiding measure may be, for example, issuing a warning signal to a driver of the motor vehicle and/or automatic braking of the motor vehicle. For the characterization of objects in the surrounding area, for example, sensor data of at least two sensor devices are received by at least one sensor control unit of the motor vehicle, and measurement points in the sensor data are detected or identified. The measurement points are characterized, and it is thus determined whether the measurement points detected by different sensor devices come from a single object or multiple objects.

The measurement points are recorded in particular in received sensor data of at least one lidar sensor and/or at least one camera and/or at least one radar sensor and/or at least one ultrasonic sensor of the sensor devices. The fields of view or detection areas of the sensor devices may overlap partially in an intersection or overlap area. The at least two sensor devices can be similar, i.e. sensor devices operating according to the same measuring principle or various types of sensor devices, i.e. sensor devices working according to various measuring principles. In the case of sensor devices comprising distance sensors, for example lidar sensors, radar sensors or ultrasonic sensors, the measurement points correspond to reflection points in a sensor signal emitted by the distance sensors and reflected by the surface area of the objects. A position value, i.e. a distance value and an orientation value, for example an angle to a reference axis, can be assigned to each reflection point or measurement point, so that using the measurement points the relative positions of the surface areas and thus the positions of the objects relative to the motor vehicle can be detected.

The first and second measurement points lie in non-overlapping areas of the detection areas of at least two sensor devices. The first measurement points are thus in a first detection area of the first sensor device and the second measurement points are in a second detection area of the second sensor device. The overlap-free areas may result, for example, from the fact that the detection areas of the sensor devices generally do not overlap or that the detection areas of the sensor devices are not in the distance range in which the measurement points or the surface areas are located. However, in order to be able to assess whether the measurement points and thus the surface areas belong to the same object, the relative position of the surface areas is recorded based on the first and second measurement points. The relative position can then be used to evaluate whether the surface areas belong to the same object and can therefore be combined into the total surface area, or whether the surface areas belong to two separate objects and therefore cannot be combined.

The method results on the one hand in the advantage that surface areas that are located in at least partially overlap-free detection areas are not incorrectly assigned to two separate objects. In this way, it can be prevented that the area between the two separate objects, which is actually occupied by another surface area of the individual object, is incorrectly evaluated as an area that can be used for the motor vehicle. On the other hand, the advantage arises that by combining or merging surface areas belonging to the same object the amount of data can be reduced when storing the object information.

Preferably, a distance of two directly adjacent first and second measurement points is determined as the relative position of the surface areas to each other and it is determined whether the surface areas are to be assigned to a single object based on the distance. The distance of the directly adjacent first and second measurement points is determined for characterization of the measurement points and thus of the surface areas. The detection areas each have an inner boundary and an outer boundary, wherein the inner boundaries of the detection areas are adjacent to each other. The directly adjacent measurement points are those first and second measurement points having the smallest distance to the inner boundaries of the respective detection areas. The directly adjacent first and second measurement points are detected as the two measurement points having the smallest distance from each other. The area between these directly adjacent measurement points can now be either an object-free area between two separate objects or a third surface area of the same object connecting the two surface areas. Based on the distance between the two directly adjacent measurement points, the area between these measurement points can be characterized. Thus, it can be particularly easily assessed whether surface areas detected based on measurement points are to be assigned to the same object or to separate objects in the surroundings of the motor vehicle.

It may be provided that a first contour line is determined based on the first measurement points, a second contour line is determined based on the second measurement points, and the first contour line and the second contour line are connected to a total contour line representing the total surface area, depending on the distance between the two adjacent first and second measurement points, which correspond to mutually facing end points of the contour lines. The respective contour lines represent a profile of the surface areas relative to the motor vehicle. For example, the two contour lines can be determined by means of a balancing calculation based on the respective measurement points. The facing end points of the contour lines correspond to the adjacent first and second measurement points in the respective detection areas. If it has been determined that the surface areas are to be associated with the same object using the distance between the contour end points, the end points can be joined together resulting in the total contour line. This total contour line then represents the total surface area of the individual object. Based on the total contour line, the position of the total surface area and thus the position of the object relative to the motor vehicle can then be determined particularly easily. If it has been shown that the surface areas are not to be assigned to the same object based on the distance of the end points of the contour lines, the unconnected contour lines can be used to determine the positions of the surface areas and thus the positions of the separate objects relative to the motor vehicle.

In one embodiment of the invention, the first and second surface areas are assigned to a single object and combined into the total surface area if the distance falls below a predetermined threshold value. The threshold may, for example, have a value corresponding to at least the width of the motor vehicle. If the distance is less than the threshold value, i.e. less than the width of the motor vehicle, the surface areas are combined into the total surface area. The resulting total surface area is thus evaluated as the surface area of an object, which is an obstacle to the motor vehicle. Otherwise, the surface areas are mapped to separate objects. From the comparison of the distance between the two directly adjacent first and second measurement points or the end points of the two contour lines with the threshold value, the advantage is that the evaluation of how many objects the surface areas are to be assigned to can be carried out in a particularly simple and rapid way. On the other hand, in a case in which the surface areas are in reality actually assigned to two objects and therefore were wrongly combined, there is no disadvantage, since the area between the two surface areas is not passable for the motor vehicle in any case.

Alternatively or additionally, the first and second surface areas are assigned to a single object and combined into the total surface area if values of the distance in at least two measurements of the sensor devices differ by no more than a predetermined limit value. According to this embodiment, multiple measurements are made, and the distance values are determined in the multiple measurements. If the values of the distance differ by no more than the predetermined limit value, it can be assumed that the surface areas are to be assigned to a single object. In particular, the limit value shall be chosen in such a way that if the difference is less than this limit value it can be assumed that the distance between two measurements is essentially constant. This embodiment is based on the realization that a perspective of the sensor devices changes between two measurements due to the movement of the motor vehicle. If the surface areas are the surface areas of separate objects, the distance values change during measurements. If the surface areas are the surface areas of a single object, the values of the distance between measurements do not change substantially. By repeatedly determining the distance values in at least two measurements, it is possible to check in a particularly reliable manner whether the surface areas are the surface areas of different objects or not.

Particularly preferably, the assignment of the surface areas is carried out by at least one decentralized sensor control unit of the motor vehicle and at least one object information item determined based on the assignment is transmitted by the at least one decentralized sensor control unit to a central control unit of the motor vehicle. For example, it may be provided that the sensor devices communicate with the sensor control unit, which can identify the measurement points in the sensor data of the sensor devices and can assign the measurement points to the surface areas of objects. In addition, the relative position of the surface areas can be determined by the at least one decentralized sensor control unit, and it can thus be evaluated to how many objects the surface areas are to be assigned. The sensor control unit can therefore determine how many objects are in the surrounding area of the motor vehicle. Based on this, surface areas can be combined into total surface areas or not.

Information on the surface areas or the total surface areas, for example a spatial location of the surface areas or the total surface areas, can be determined by the decentralized sensor control unit as the object information and transmitted to the central control unit of the motor vehicle. For this purpose, at least one sensor control unit and the central control unit can communicate wirelessly and/or by wire, for example via a bus. For example, the central control unit may be designed to perform an assistance function based on the object information. Such an assistance function may be, for example, the provision of collision-avoidance measures and/or at least semi-autonomous manoeuvring of the motor vehicle in the surrounding area. In order to prevent excessive amounts of data from being transmitted in the form of measurement points to the central control unit, which the central control unit then has to evaluate extensively, the measurement points are characterized by the decentralized sensor control unit and reduced to the object information that is provided to the central control unit.

In a development of the invention, at least one non-passable exclusion zone for the motor vehicle in the surrounding area is determined based on the surface areas. The surrounding area is therefore divided into sub-areas that are navigable and non-passable for the motor vehicle. The subdivision can be carried out by the central control unit based on the object information determined by the decentralized sensor control unit. The exclusion zones as well as the zones or areas that can be used for the motor vehicle can be stored in an environmental map describing the surrounding area. Based on the environmental map, the motor vehicle can be manoeuvred autonomously or fully automatically and collision-free in the surrounding area by means of the central control unit.

In an advantageous embodiment, in the case in which additionally third measurement points of a third surface area in an overlap area of detection areas of the sensor devices are received, confidence values for the sensor devices are determined based on the third contour points. According to this embodiment, the detection areas of the sensor devices overlap at the distance at which the surface areas of the object or objects are located. In the overlap area, the third measurement points can be located that are detected by the first and/or at least a second sensor device. Based on the third measurement points, it can be checked whether the surface areas have been assigned correctly to a single object or to separate objects. At the same time, the reliability of the sensor devices can also be evaluated when recording the measurement points. The measurements of the sensor devices can therefore be checked for plausibility. For this purpose, the confidence values for the sensor devices are determined. The confidence values describe or quantify the confidence that can be placed in the correctness of measurements of the sensor devices. In other words, the confidence value is a measure of confidence in the accuracy of the measurements of the sensor devices.

In particular, in the case in which the third measurement points are detected by the at least two sensor devices, a first confidence value is assigned to the sensor devices, and in the case in which the third measurement points are only detected by one of the sensor devices, the other sensor device is assigned a second confidence value lower than the first confidence value. If the surface areas recorded based on the measurement points of at least two sensor devices are combined based on the relative position of the surface areas, third measurement points would have to be located in the sensor data from the overlapping area of the detection areas of both sensor devices. If this is the case, the first confidence value can be assigned to both sensor devices, which indicates that both sensor devices measure reliably. In other words, the accuracy of the measurements of both sensor devices can be trusted. If only the third measurement points of one sensor device are located in the sensor data from the overlapping area, the second confidence value is assigned to the sensor device that does not detect third measurement points within the overlapping area. This indicates that the measurements of this sensor device should be given less confidence. For example, the sensor device may be defective or dirty and should possibly be checked. In this case, for example, an information signal can be issued to the driver of the motor vehicle.

It may be provided that, depending on the confidence values of the sensor devices, weighting factors for the measurement points of the sensor devices are determined for the weighting of the measurement points when detecting objects. The confidence values of the at least two sensor devices are thus transferred by the weighting of the measurement points of the respective sensor devices to the measurement points detected by the sensor devices as well as the surface areas of objects recorded based on the measurement points. In addition, each surface area or object can be assigned a confidence value dependent on the sensing sensor device, which can also be entered into the environmental map, for example. For example, the confidence value of the object indicates the probability that the object being detected by the respective sensor devices actually exists. As a result of determining the confidence values or weighting factors, the process is particularly reliable.

The invention also relates to a sensor control unit for a driver assistance system of a motor vehicle, which is designed to perform a method according to the invention or an advantageous embodiment thereof. The sensor control unit is in particular a decentralized control unit in the motor vehicle, which is designed to receive sensor data of at least two sensor devices, to identify the measurement points in the sensor data, to determine the relative position of the surface areas with respect to each other based on the measurement points and to assign the surface areas to one or more objects based on the relative position. The assignment and location information of the object or objects can be determined by the sensor control unit.

The invention also relates to a driver assistance system for a motor vehicle with at least two sensor devices for detecting measurement points of surface areas of objects in a surrounding area of the motor vehicle and with at least one sensor control unit according to the invention. The driver assistance system may also have a central control unit that can communicate with at least one sensor control unit. For example, the sensor control unit can transmit object information to the central control unit, based on which the sensor control unit can perform an assistance function of the driver assistance system.

A motor vehicle according to the invention comprises a driver assistance system according to the invention. The motor vehicle is in particular embodied as a passenger car.

The preferred embodiments presented with reference to the method according to the invention and their advantages apply accordingly to the sensor control unit according to the invention, to the driver assistance system according to the invention as well as to the vehicle according to the invention.

Further features of the invention result from the claims, the figures and the description of the figures. The features and combinations of features mentioned above in the description, as well as the features and combinations of features mentioned below in the description of the figures and/or shown in the figures alone, may not only be used in the respective specified combination, but also in other combinations or on their own, without departing from the scope of the invention. Therefore, embodiments and combinations of features that are not explicitly shown and explained in the figures but emerge from and are capable of being produced from separate combinations of features from the described embodiments are also to be regarded as included and disclosed versions of the invention. It is also necessary to regard as disclosed designs and combinations of features that therefore do not show all the features of an originally formulated independent claim. In addition, embodiments and combinations of features, in particular those described above, that go beyond or deviate from the combinations of features set out in the references to the claims must be regarded as disclosed.

The invention is now explained in more detail based on preferred embodiments as well as with reference to the attached drawings.

In the figures.

In the figures, the same and functionally equivalent elements are provided with the same reference characters.

Figure 1:
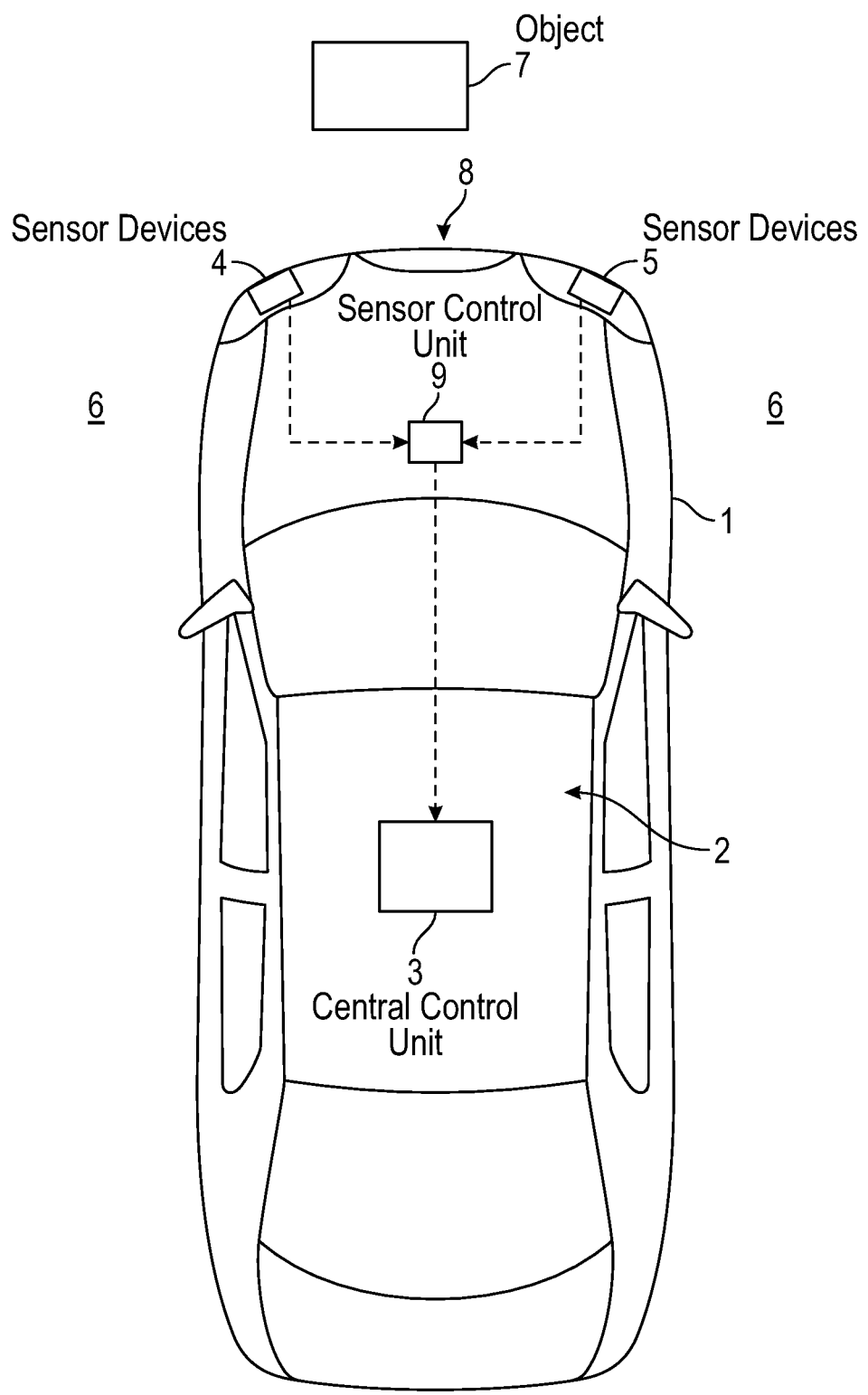
FIG. 1 shows a schematic representation of an embodiment of a motor vehicle according to the invention.

FIG. 1 shows a motor vehicle 1 according to an embodiment of the present invention. In the present case, the motor vehicle 1 is designed as a passenger car. The motor vehicle 1 has a driver assistance system 2, which is designed to assist a driver of the motor vehicle 1 in driving the motor vehicle 1. For example, the driver assistance system 2 can manoeuvre the motor vehicle 1 autonomously or fully automatically. For this purpose, a central control unit 3 of the motor vehicle 1 can, for example, take over the longitudinal guidance and the lateral guidance of the motor vehicle 1, thus automatically steering, accelerating and braking the motor vehicle 1. The driver assistance system 2 has at least two sensor devices 4, 5, which are designed to monitor a surrounding area 6 of the motor vehicle 1. Using the sensor devices 4, 5, objects 7 can be detected in the surrounding area 6. The sensor devices 4, 5, which are arranged here on a front area 8 of the motor vehicle 1, can be similar or different sensor devices. The sensor devices 4, 5 are in particular embodied as the same type, as lidar sensors, for example as laser scanners. In addition, the driver assistance system 2 has a decentralized sensor control unit 9, to which sensor data of the sensor devices 4, 5 are provided for evaluation. The decentralized sensor control unit 9 can communicate with the central control unit 3 and can transmit, for example, environmental information that has been recorded using the sensor data of the sensor devices 4, 5 to the central control unit 3.

Figure 2:
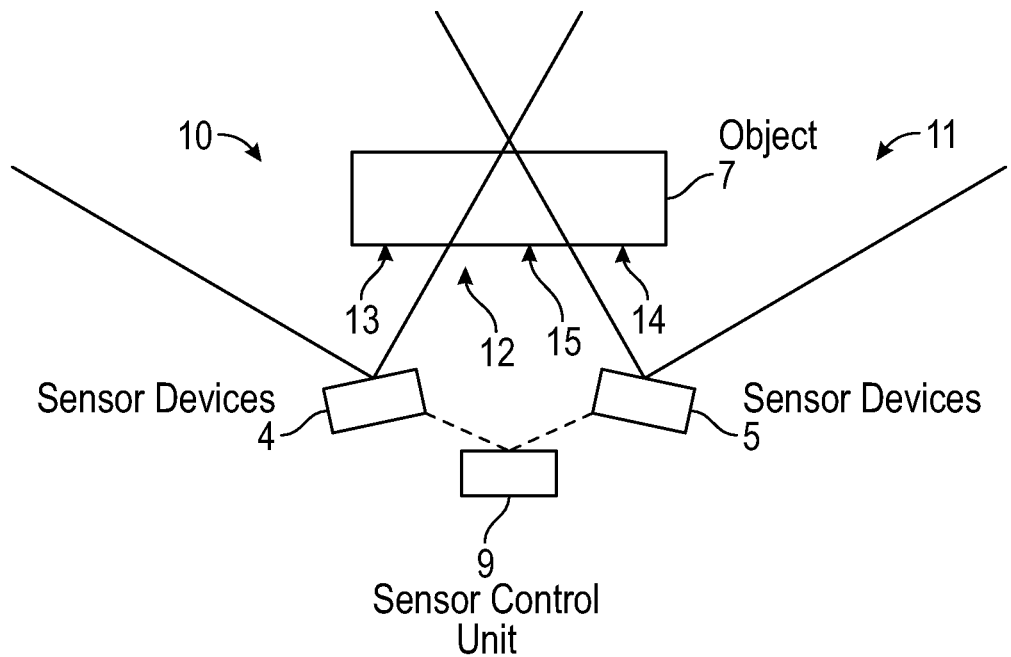
FIG. 2 shows a schematic representation of two sensor devices and an object that is only partially located in the detection areas of the sensor devices.
Figure 3:
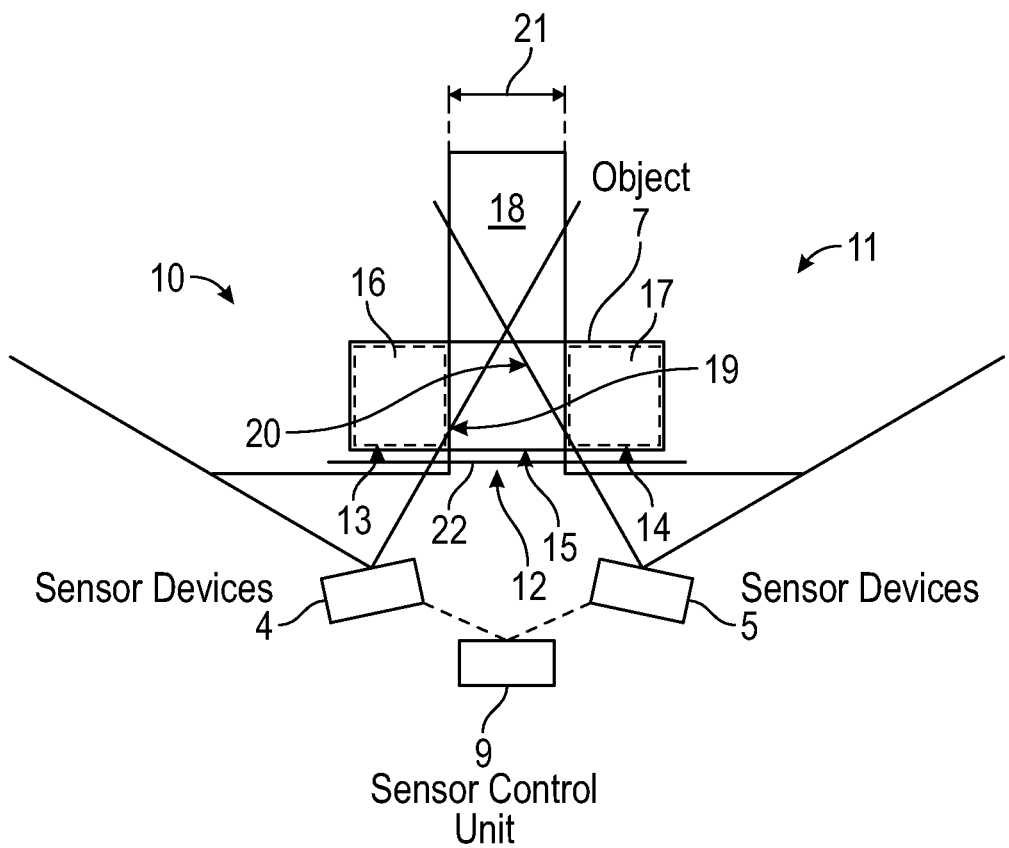
FIG. 3 shows a schematic representation of the two sensor devices according to FIG. 2 when detecting the object that is only partially located in the detection areas of the sensor devices.

FIG. 2 and FIG. 3 show schematically the sensor devices 4, 5, the decentralized sensor control unit 9 and the object 7. In addition, detection areas 10, 11 of the sensor devices 4, 5 are shown. In this case, a first sensor device 4 has a first detection area 10 and a second sensor device 5 has a second detection area 11. The detection areas 10, 11 do not overlap at the distance of a total surface area 12 of the object 7 relative to the sensor devices 5, wherein the total surface area 12 of the object 7 is formed here by a front side of the object 7 facing the sensor devices 4, 5. In other words, the detection areas 10, 11 have no overlap area at the distance of the total surface area 12 of the object 7 from the sensor devices 4, 5. As a result, a first surface area 13 of the total surface area 12 of the object 7 lies in the first detection area 10 of the first sensor device 4, a second surface area 14 of the total surface area 12 of the object 7 lies in the second detection area 11 of the second sensor device 5 and a third surface area 15 of the total surface area 12 of the object 7 lies outside the detection areas 10, 11 of both sensor devices 4, 5. Nevertheless, all surface areas 13, 14, 15 belong to the object 7 and form the total surface area 12. First sensor data of the first sensor device 4 thus have first measurement points only in the first surface area 13 and second sensor data of the second sensor device 5 have second measurement points only in the second surface area 14. The surface areas 13, 14 can be detected based on the first and second measurement points of the sensor devices 4, 5. For example, contour lines representing the surface areas 13, 14 can be determined using the first and second measurement points.

FIG. 3 shows that the surface areas 13, 14 may be identified as two separate objects 16, 17, since no sensor data of the sensor device 4, 5 are available from an area 18 between inner boundaries 19, 20 of the detection areas 10, 11 in which the third surface area is located. In order to prevent the third surface area 15 from being ignored and the area 18 being incorrectly assessed as an area or corridor that can be used for a motor vehicle 1, the relative position of surface areas 13, 14 with respect to each other is determined. In particular, a distance 21 of first and second measurement points that are directly adjacent to each other is determined in the sensor data of the sensor devices 4, 5. The mutually adjacent first and second measurement points are in particular the first measurement point lying on the inner boundary 19 of the first detection area 10 and the second measurement point lying on the inner boundary 20 of the second detection area 11.

If this distance 21 falls below a predetermined threshold value and/or if the value of the distances 21 remains substantially constant over at least two measurements, it can be assumed that the surface areas 13, 14 are sub-areas of the total surface area 12. The objects 16, 17 determined as separate are thus sub-object areas of the object 7. Therefore, the surface areas 13, 14 are combined into the total surface area 12. For this purpose, the contour lines representing the surface areas 13, 14, for example, can be connected to a total contour line 22. The third surface area 15 is thus artificially generated. Based on the sensor data of the two sensor devices 4, 5, for example using the contour line 22, the position can also be determined, i.e. the distance and orientation of the total surface area 12, and thus the position of the object 7 relative to the motor vehicle 1. The total surface area 12 and the position thereof can be determined, for example, by the sensor control unit 9, which can transfer the position of the total surface area 12 as object information to the central control unit 3. Using the total surface area 12, the central control unit 3 can determine an exclusion zone that may not be traversed by the motor vehicle 1. The exclusion zone extends over a total length of the total surface area 12. This exclusion zone can be entered, for example, into an environmental map describing the surrounding area 6, based on which the central control unit 3 can manoeuvre the motor vehicle 1, for example.

Figure 4:
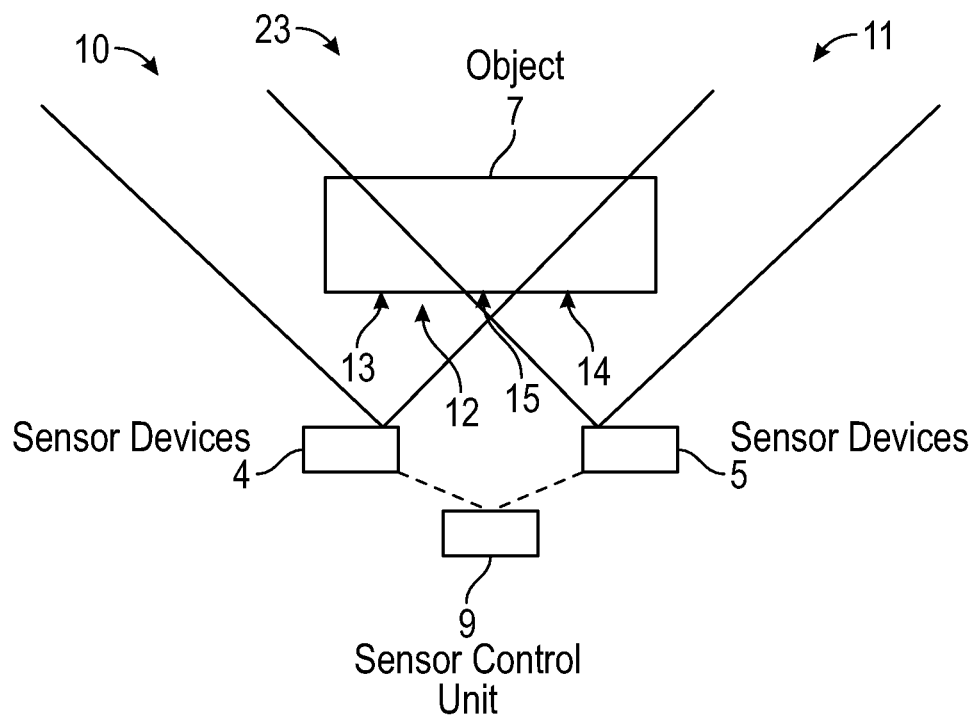
FIG. 4 shows a schematic representation of the two sensor devices and an object that is located entirely in the detection areas of the sensor devices.
Figure 5:
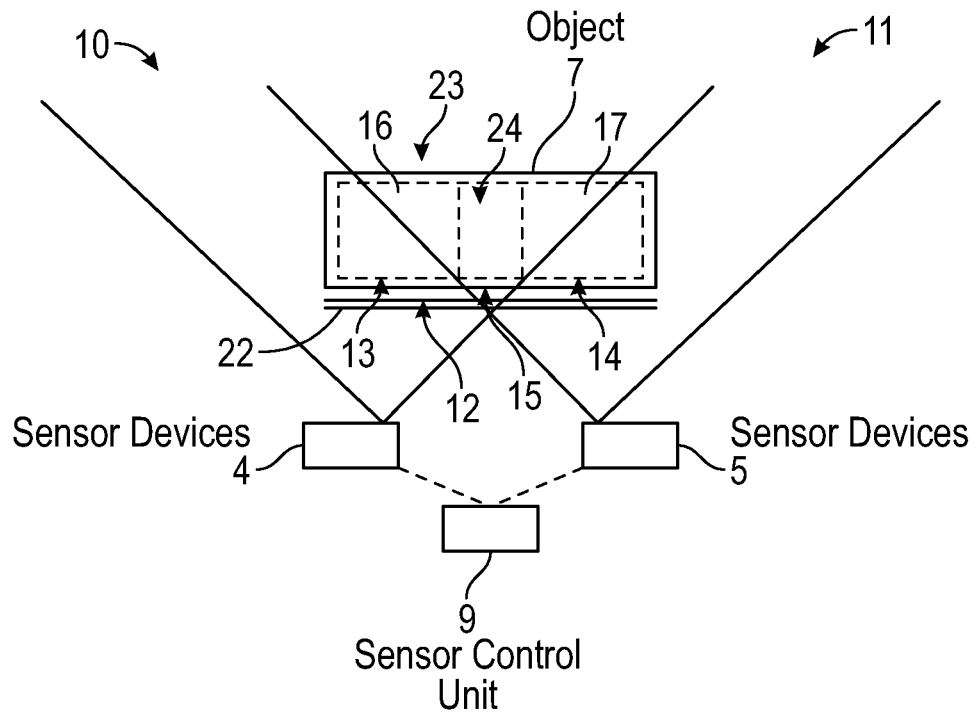
FIG. 5 shows a schematic representation of the two sensor devices according to FIG. 4 when detecting the object that is located entirely in the detection areas of the sensor devices.

FIG. 4 and FIG. 5 show that the detection areas 10, 11 of the sensor devices 4, 5 overlap at the distance of the object 7 and thereby form an overlap area 23. Thus, the third surface area 15 of the object 7 is in the overlap area 23 and thus in the detection areas 10, 11 of both sensor devices 4, 5. Third measurement points that correspond to the third surface area 15 can be located in the sensor data of both sensor devices 4, 5. FIG. 5 shows that the separate objects 16, 17, which were detected based on the sensor data of the first and second sensor devices 4, 5, overlap in an object area 24, so that the total surface area 12 can be determined by combining the surface areas 13, 14, 15. The third surface area 15 does not have to be created artificially here, but can be detected directly. Based on the total surface area 12, the total contour line 22 can then be determined.

In addition, the third measurement points can be used to evaluate the reliability of the sensor devices 4, 5 during measurement. If one of the sensor devices 4, 5, for example the first sensor device 4, does not detect any third measurement points in the overlap zone 23, while the second sensor device 5 detects third measurement points in the overlap zone 23, the measurements of the first sensor device 4 can be given a lower confidence than the measurement points of the second sensor device 5. The confidence can be given a value, for example, by means of a confidence value that is assigned to the measurement points of the sensor devices 4, 5. The measurement points of the second sensor device 5 are given a high confidence and the measurement points of the first sensor device 4 are given a lower confidence. This confidence can be dimensioned or quantified by assigning a higher confidence value to the second sensor device 5 compared to the first sensor device 4. The confidence values of the sensor devices 4, 5 can also be given to the objects 7 detected by the sensor devices 4, 5, so that the probability of an object 7 being at the position in the surrounding area 6 detected by the respective sensor device 4, 5 is expressed by the confidence values of the objects 7.

The invention claimed is:

1. A method for monitoring a surrounding area of a motor vehicle, comprising:
   receiving measurement points of surface areas of objects in the surrounding area that are detected by at least two sensor devices of the motor vehicle, wherein first measurement points of a first surface area detected by a first sensor device are received, and second measurement points of a second surface area that is free of overlaps with the first surface area that are detected by a second sensor device are received;
   determining a relative position of the first and second surface areas with respect to each other;
   based on the relative position, determining whether the first and second surface areas are to be assigned to a single object and, when the first and second surface areas are assigned to the single object, the surface areas are combined to form a total surface area of the object; and
   performing a driver assistance function based on the combined total surface area of the object.

2. The method according to claim 1, wherein a distance of two directly adjacent first and second measurement points is determined as the relative position of the first and second surface areas with respect to each other and based on the distance it is determined whether the surface areas are to be assigned to a single object.

3. The method according to claim 2, wherein a first contour line is determined based on the first measurement points, a second contour line is determined based on the second measurement point, and depending on the distance of the two adjacent first and second measurement points, which correspond to mutually facing end points of the contour lines, the first contour line and the second contour line are combined into a total contour line representing the total surface area.

4. The method according to claim 2, wherein the first and second surface areas are assigned to a single object and are combined into the total surface area when the distance falls below a predetermined threshold value.

5. The method according to claim 2, wherein the first and second surface areas are assigned to a single object and are combined into the total surface area when values of the distance in at least two measurements of the sensor devices differ by no more than a predetermined limit value.

6. The method according to claim 1, wherein the assignment of the surface areas is carried out by at least one decentralized sensor control unit of the motor vehicle, and at least one item of object information determined by the at least one decentralized sensor control unit based on the assignment is transmitted to the central control unit of the motor vehicle.

7. The method according to claim 1, wherein based on the surface areas at least one exclusion zone in the surrounding area that is not navigable by the motor vehicle is determined.

8. The method according to claim 1, wherein in the case in which in addition third measurement points of a third surface area located in an overlap area of the detection areas of the sensor devices are received, confidence values for the sensor devices are determined based on the third measurement points.

9. The method according to claim 8, wherein in the case in which the third measurement points are detected by the at least two sensor devices, the sensor devices are assigned a first confidence value, and in the case in which the third measurement points are only detected by one of the sensor devices, the respective other sensor device is assigned a lower second confidence value than the first confidence value.

10. The method according to claim 8, wherein depending on the confidence values, weighting factors for the measurement points of the sensor devices are determined for the weighting of the measurement points when detecting objects.

11. The method according to claim 1, wherein the measurement points are detected in received sensor data of at least one lidar sensor and/or at least one camera and/or at least one radar sensor and/or at least one ultrasonic sensor of the sensor devices.

12. A sensor control unit for a driver assistance system of a motor vehicle for performing a method according to claim 1.

13. A driver assistance system for a motor vehicle with at least two sensor devices for detecting measurement points of surface areas of objects in a surrounding area of the motor vehicle and with at least one sensor control unit according to claim 12.

14. A motor vehicle with a driver assistance system according to claim 13.

* * * * *